United States Patent

Esmaeili et al.

[11] Patent Number: 6,085,763
[45] Date of Patent: Jul. 11, 2000

[54] RINSING BATH

[75] Inventors: Sasan Esmaeili, Solna; Bertil Lohman, Sollentuna, both of Sweden

[73] Assignee: Telefonaktiebolaget LM Ericsson, Stockholm, Sweden

[21] Appl. No.: 09/187,068

[22] Filed: Nov. 6, 1998

[51] Int. Cl.[7] ...................................................... B08B 3/12
[52] U.S. Cl. .......................... 134/113; 134/184; 134/201
[58] Field of Search ..................................... 134/113, 147, 134/184, 201

[56] References Cited

U.S. PATENT DOCUMENTS

| | | | |
|---|---|---|---|
| 5,363,870 | 11/1994 | Doyon ....................................... | 134/184 |
| 5,526,833 | 6/1996 | Crespel et al. ........................ | 134/184 X |
| 5,597,003 | 1/1997 | Campbell .................................. | 134/184 |

FOREIGN PATENT DOCUMENTS 817575   3/1981   U.S.S.R. ................................. 134/184

*Primary Examiner*—Philip R. Coe
*Attorney, Agent, or Firm*—Burns, Doane, Swecker & Mathis, L.L.P.

[57] ABSTRACT

A device for cleaning ends of optical fibers comprises a vessel intended to contain a rinsing fluid, in which the ends are to be inserted. A holder assembly is attached to the vessel and has a central element comprising a through-hole adapted to receive a fiber holder. The central element can be moved vertically in order to position the fiber holder at a predetermined distance from the surface of the rinsing fluid, so that only a predefined portion of an end portion of an optical fiber held by the fiber holder is emerged in the rinsing fluid. For a correct distance this will protect the primary coating of the optical fiber from being wet by the fluid. A light guide is mounted in the central element. Its lower end projects through a predetermined distance from the bottom surface of the central element. The upper end surface of the light guide has a lens shape and can be viewed by an operator, so that when moving the central element by turning an adjustment ring the change of coloring of the upper surface of the light guide will indicate a contact between the lower end and the liquid surface. A piezoelectrical vibrator is connected to the vessel for conveying ultrasonic vibrations thereto and transmits vibrations having a scanning frequency, the variation of frequency eliminating the risk of forming stationary nodes in the liquid where no cleaning effect is achieved.

7 Claims, 2 Drawing Sheets

RINSING BATH

The present invention relates to a rinsing bath for optical fibers, in particular for optical ribbon fibers.

BACKGROUND

Optical fibers are presently widely used for communicating information. In the physical installation of optical fibers in e.g. networks such as in large telecommunication systems, in computers, LANs, optical fibers have to spliced to each other and connected to various physical device such as lasers, light detectors, couplers, etc. Also in maintenance of existing optical fiber installations there is a need for repairing optical fibers, this also requiring that optical fibers are spliced to each other. Optical fibers composed to ribbon fibers are more and more used since ribbon fibers hold a plurality of optical fibers and are more easily handled than individual fibers. When making splices or connections to devices the primary protection coating of the optical fibers has to be removed in order to expose the bare optical fiber, this operation being called to strip the optical fibers. The primary protection coating is commonly made of an artificial resin such as acrylic plastics. The stripping operation mostly leaves some dust or particles on the bare portion of the optical fibers and this dust must be removed. Finally the optical fibers are cut off a right angles and then the splicing or connection operation is performed. In the cutting and splicing operations the bare fiber ends are positioned very accurately in relation to another fibers or an input or output surface area of a device. For this positioning often some kind of positioning planes or surfaces are used, such as V-grooves. For such positioning to be accurate the bare fiber ends should be extremely clean, since also a very small dust particle can jeopardize the required accuracy.

Dust and particles can adhere rather strongly to stripped, bare fiber ends and it may be difficult to have them completely removed. The removal of dust and particles of stripped fiber ends has often, in a simple way, been executed by moistening a cloth with some alcohol and then wiping the ends. However, such a wiping procedure is not quite satisfactory since the cloth can itself leave some particles. In addition, in some applications, e.g. High Strength Splicing, the bare fibers should not touched by any rough objects or materials.

SUMMARY

It is an object of the invention to provide a device for cleaning optical fibers which can easily be handled and used in the field and has an efficient rinsing or cleaning action.

It is another object of the invention to provide a device for cleaning optical fibers in which the risk of wetting the primary protective coating of the fibers is minimized.

The problem solved by the invention is thus how to construct an efficient device for cleaning optical fibers so that the device can easily be handled and used in the field and so that the risk of wetting the primary protective coating is low and the rinsing effect still is maintained at a high level.

Thus, a device for cleaning ends of optical fibers comprises a vessel intended to contain a suitable rinsing liquid and having a transport lid, protecting the interior of the vessel and a rinsing liquid contained therein. A holder assembly is attached to the vessel and has an adjustment unit. The adjustment unit comprises a central element and adjustment ring which are rotatably attached to each other. The adjustment ring cooperates with a holder unit comprising holder ring attached to the vessel and a base ring having a thread engaging a thread of the adjustment ring. The central element has a through-hole adapted to receive a fiber holder. The adjustment unit and thus the central element can be moved vertically by turning the adjustment nut. Thereby the fiber holder can be positioned at a predetermined distance of the surface of the rinsing fluid, so that only a predefined portion of an end portion of an optical fiber held by the fiber holder is immersed in the rinsing liquid. For a correct distance this will protect the primary coating of the optical fiber from being wet by the liquid. The exact positioning is carried out using a light guide mounted in the central element. The light guide has a lower end projecting through a predetermined distance from the bottom surface of the central element. The upper end of the light guide has a polished flat end surface and can be viewed by an operator, so that when moving the central element by turning the adjustment ring the change of coloring of the upper surface of the light guide will indicate a contact between the lower end and the liquid surface.

A piezoelectrical element or vibrator is connected to the vessel for conveying ultrasonic vibrations thereto. It transmits vibrations having a varying frequency, the variation of frequency eliminating the risk of forming stationary nodes in the liquid where no cleaning effect is achieved. An indicator is provided signalling that the cleaning operation is finished and that the fiber holder together with fibers held thereby can be extracted from the hole in the adjustment unit when the vibrations are still excited and the cleaning action still is active, this preventing recontaminating the fibers.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
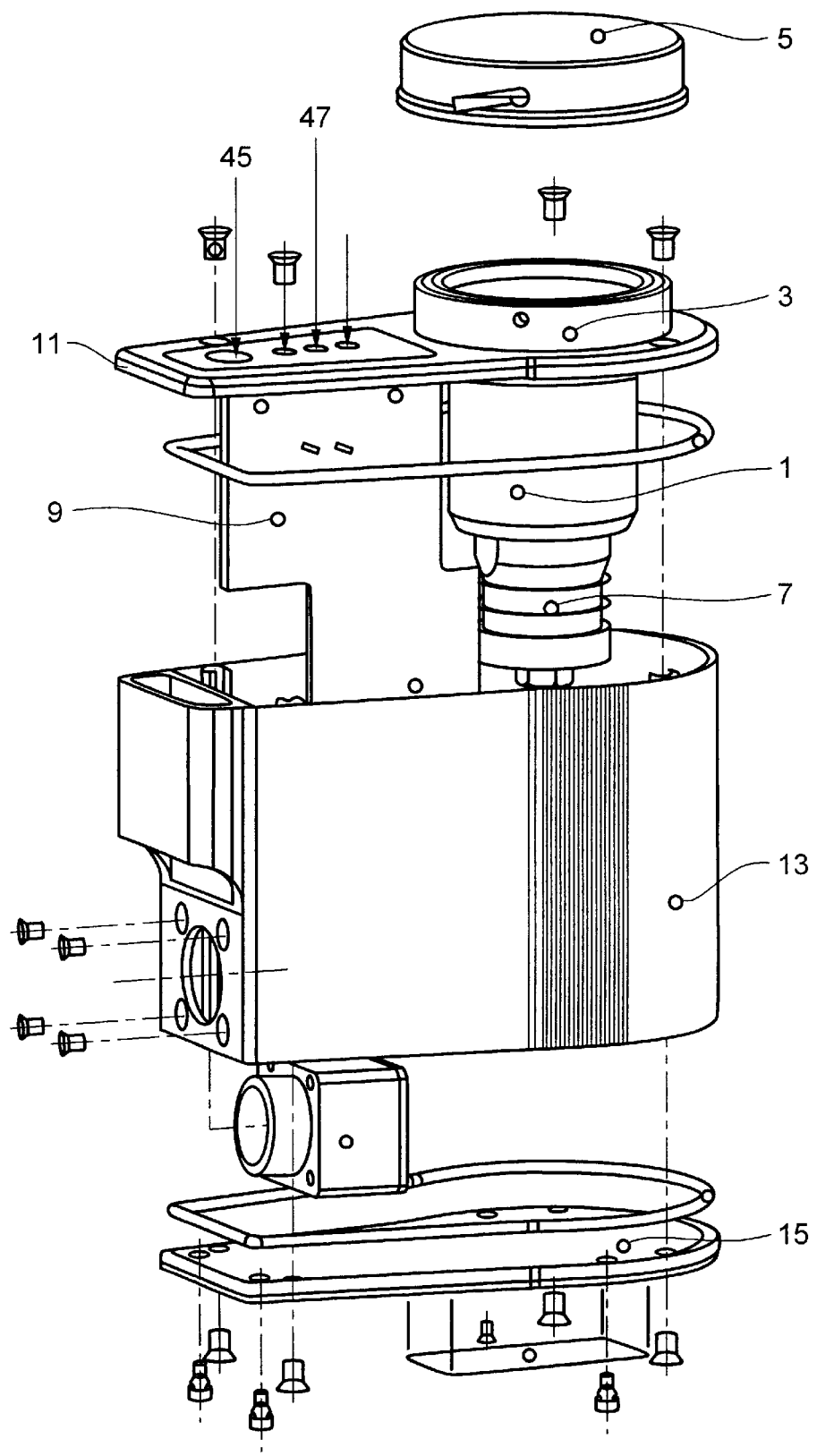
FIG. 1 is an exploded perspective view of a device for cleaning optical fibers.

In FIG. 1 an exploded view of an ultrasonic rinsing bath for optical fibers is shown. It comprises a rinsing vessel 1, a holder assembly 3, a protective transport lid 5, a piezoelectric element 7, an electronic circuit board 9, an upper plate 11, a house 13 and a bottom plate 15. The rinsing vessel 1 is attached to the holder assembly 3 at its upper edge, see also the sectional view of FIG. 2. The holder assembly is mounted in a through-hole in the upper plate 11 and projects into the interior of the house 13, in which also the vessel 1 is located. The piezoelectric element 7 has the shape as a low circular cylinder and is mounted to the bottom of the vessel 1. The house 13 is open at its top and bottom side and is there closed by the upper plate 11 and the bottom plate 15 respectively. The transport lid 5 is detachably mounted at the top surface of the holder assembly 3 and is used only when the bath assembly is transported and the vessel contains a liquid.

Figure 2:
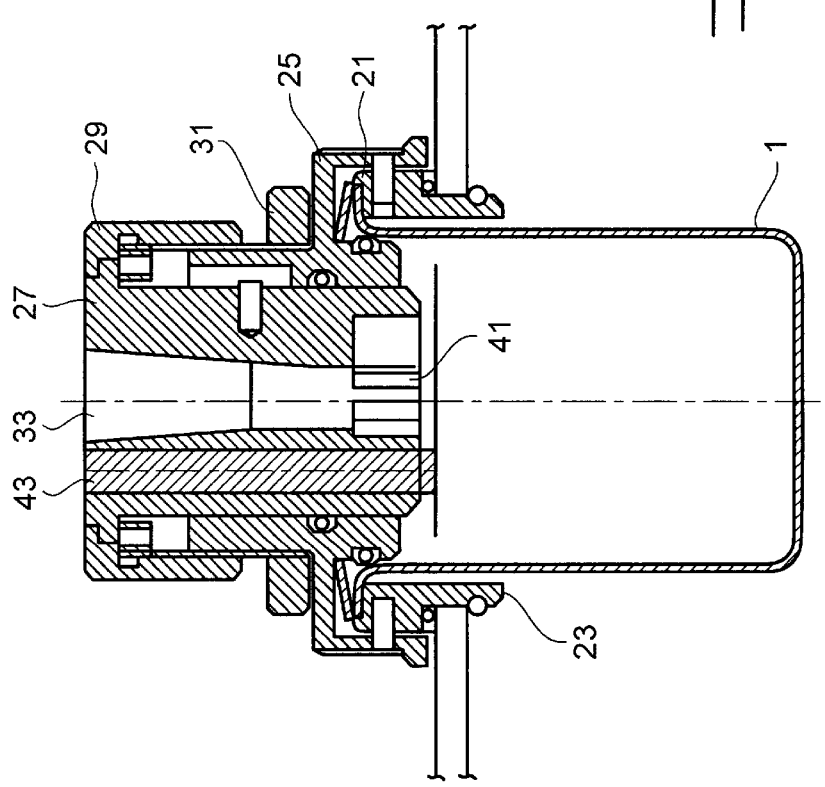
FIG. 2 is a sectional view of a cleaning vessel and a holder unit of the device of FIG. 1.

The details of the vessel 1 and the holder assembly 3 appear from the sectional view of FIG. 2. The vessel 1 has a basically circular cylindrical shape. Its upper marginal portion is bent outwards to form a flange 21. The flange 21 is retained between two components of the holder assembly 3, a base ring 23 attached to the upper plate 11 and a holder ring 25. A central element 27 is mounted to slide in the holder ring 25 and is at its upper side rotatably attached to an adjustment ring 29. The adjustment ring 29 is attached to the holder ring 25 through a thread. A locking nut 31 is connected to the holder ring 25 through the same thread. The adjustment ring 29 will when rotated be displaced upwards or downwards owing to the threaded connection to the holder ring 25, the direction being dependent on the rotation direction. The central element 27 will accompany the movement upwards or downwards of the adjustment ring 29 but will not be rotated.

Figure 3:
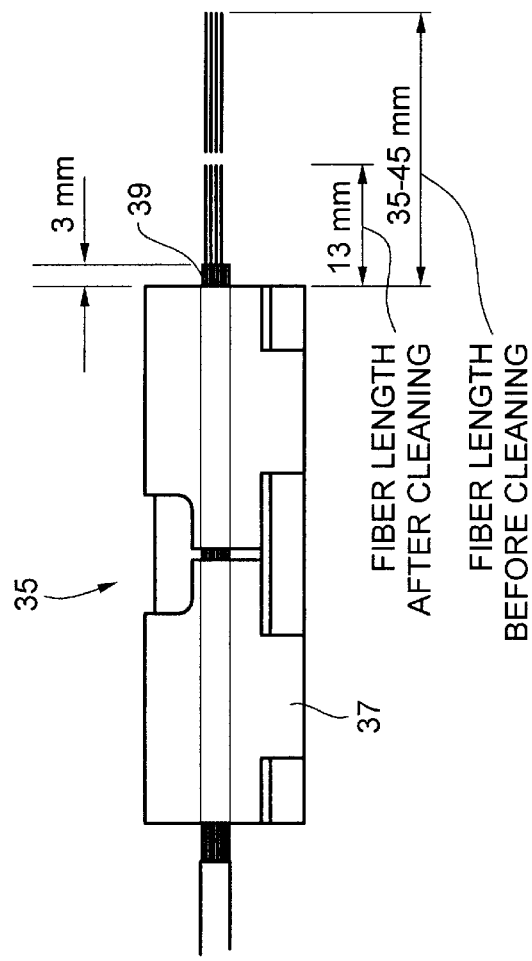
FIG. 3 is a top view of a fiber holder holding a four-fiber ribbon fiber.

In the center of the central element 27 a through-hole 33 is provided which is adapted to receive and firmly hold a fiber holder 35, see FIG. 3. The fiber holder 35 has generally the shape of a low rectangular box comprising two openable lids 37 which when closed firmly hold a ribbon fiber 39. The through-hole 33 is somewhat tapering in its upper portions, this simplifying the insertion of the fiber holder 35. The fiber holder will when fully inserted with its lower end surface abut a projection 41 projecting from the walls of the through-hole 33 towards the center of the hole. The projection still leaves room for the fiber ribbon 39 to pass downwards from the fiber holder 35 into the vessel 1.

In the central element 27 also a light guide 43 is mounted in a hole extending in parallel to the through-hole 33 but displaced from the center position. The light guide 43 can be glass or plastics rod. Its lower end, which is a flat surface perpendicular to the light guide axis, projects an accurately defined distance from the bottom surface of the central element 27. The upper end can have a flat polished surface allowing the colour thereof to be viewed.

The operation of the ultrasonic rinsing device will now be described. An optical ribbon fiber 39 for example comprising four parallel fibers is mounted in the fiber holder 35, the free end portion of the fiber ribbon extending 35–45 mm from the end surface of the fiber holder. This free end portion is stripped of its polyacrylic protective coating so that a definite, accurately determined small length of e.g. 3 mm of the coating is left immediately at the fiber holder 35, the rest of the free end portion comprising the bare fibers.

The protection lid 5 of the rinsing device is removed, rinsing fluid such as suitable alcohol like ethanol or propanol is filled into the vessel 1 up to some level mark, not shown, made inside in the vessel 1. The level mark is located to give a suitable level of the upper surface of the cleaning liquid, so that e.g. the level is always somewhat below the bottom surface of the central element 27. In this operation all of the holder assembly 3 may be removed by having turned the holder ring 25 in a suitable direction.

The vertical position of the central element is then adjusted. Then first the adjustment ring 29 is turned in a suitable direction to move it to the highest possible position, generally in an anti-clockwise direction. The locking nut 31 is then moved to its lowest position by turning it, generally in a clockwise direction, as seen from the top. The holder assembly 3 is mounted to the base ring 23 by making the threads engage and turning in a suitable direction if the assembly has been previously removed. The upper surface of the light guide 43 is observed while turning the adjustment ring 29 to make it move downwards, generally in a clockwise direction as seen from above. The turning of the ring is stopped exactly at the moment when the coloring of the lens-shaped top surface of the light guide 43 becomes darker, this fact signalling a contact of the lower end of the light guide with the surface of the liquid in the vessel 1. Finally the locking nut is turned to move it upwards, generally in an anti-clockwise direction, until is engages the bottom surface of the adjustment ring 29 and locks it in its current position.

The fiber holder 35 and its firmly retained ribbon fiber 39 are then inserted in the central hole 33 in the central element 27 as far as possible downwards until the lower end surface of the fiber holder 25 engages the projection 41. The cleaning process is started by pressing a "Start/Stop" button 45 on the top plate 11. A light emitting diode 47, also positioned on the top plate 11, is then made to issue visible light to indicate the start of the cleaning process. The piezoelectrical element 7 is at the same time energized to make it vibrate and thereby transmit the generated ultrasonic vibrations to the vessel 1 and to the liquid in the vessel thereby cleaning the immersed optical fibers. However, then the vibrations generated in the liquid may be apt to form a standing-wave pattern in the liquid, such a pattern having fixed nodes in which the liquid practically does not move and thus does not have any cleaning or rinsing action. In order to alleviate this phenomenon the frequency of the ultrasonic vibrations is varied, as controlled by the electronic circuits on the circuit board 9, by continuously changing the energizing of the piezoelectrical element 7. Typically the frequency can be varied between two definite frequencies, say 50 and 56 kHz, the variation having a time period of 1–4 seconds, preferably 1–2 seconds, for changing from the lowest to the highest frequency of the generated vibrations. After some definite time period such as 10 seconds the cleaning action is sufficient and the fiber holder can be removed. This is indicated in some suitable way, for instance by starting an audible alarm, not shown, or by changing the state of the light issued by the light emitting diode 47, for instance by changing a steady light to a blinking issued light. The fiber holder is then removed and the generation of the ultrasonic vibrations automatically stops after some suitable further time period such as 10 seconds. In that way the fibers are extracted from the liquid bath when the vibrations therein are still generated, this reducing the risk of having particles suspended in the liquid attach to the fibers and thus accompanying them in the operation of lifting the fiber holder up from the holder assembly. The fiber holder 35 is as quickly as possible mounted in some device, not shown, for example cutting the held fibers to some definite standard free length, such as a length of 13 mm, to be then used in a splicing apparatus, not shown, for connection to other fibers or for connection to other devices.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A device for cleaning ends of optical fibers, the device comprising a vessel intended to contain a rinsing fluid, in which the ends are to be inserted, a holder assembly attached to an upper edge of the vessel, an adjustment unit included in the holder assembly, the adjustment unit comprising a recess or through-hole adapted to receive a fiber holder in a definite position, the fiber holder being intended to hold an optical fiber making an end portion thereof project from the fiber holder, the adjustment unit having displacement means for moving it in directions perpendicular to a surface of a rinsing fluid, when the rinsing fluid is contained in the vessel, in order to position the adjustment unit and thereby a fiber holder received therein at a predetermined distance of said surface, so that only a predefined portion of an end portion of an optical fiber held by a fiber holder received in the recess or through-hole is immersed in the rinsing fluid.

2. The device of claim 1 further comprising piezoelectrical vibration means connected to the vessel for conveying ultrasonic vibrations to the vessel and thereby to a rinsing fluid contained in the vessel.

3. The device of claim 2 further comprising control means connected to the piezoelectrical vibration means for varying a frequency of ultrasonic vibrations generated by the vibration means.

4. The device of claim 3, wherein the control means are arranged to vary the frequency between a low frequency and a high frequency.

5. The device of claim 4, wherein the control means are arranged to vary the frequency between the low frequency and the high frequency with a time period of substantially 1–4 seconds.

6. The device of claim 1 further comprising a light guide comprised in the adjustment unit, the light guide having a lower end projecting from a bottom surface of the holder assembly, the lower end having a lower end surface located at a predetermined distance from the bottom surface, and the light guide having an upper end surface located at a top surface of the holder assembly to be viewed by an operator of the device.

7. A device according to claim 6, wherein the adjustment unit further comprises a central element including the recess or through-hole and the light guide, an adjustment ring, to which the central element is attached, a holder unit mounted to the upper edge of the vessel, the adjustment ring cooperating with the holder unit, so that, when turning the adjustment ring, the adjustment ring will by cooperation with the holder ring move closer to or more distant from the vessel and thereby the central element and a fiber holder received in the recess or through-hole will move closer to or to a position more distant from a surface of a rinsing liquid contained in the vessel.

* * * * *